US012708985B2

(12) United States Patent
Ito et al.

(10) Patent No.: US 12,708,985 B2
(45) Date of Patent: Aug. 18, 2026

(54) SUCTION PAD

(71) Applicant: SMC CORPORATION, Tokyo (JP)

(72) Inventors: Toshinori Ito, Tsukubamirai (JP); Shuhei Yamamoto, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 342 days.

(21) Appl. No.: 18/531,959

(22) Filed: Dec. 7, 2023

(65) Prior Publication Data

US 2024/0189965 A1 Jun. 13, 2024

(30) Foreign Application Priority Data

Dec. 12, 2022 (JP) ................................ 2022-197654

(51) Int. Cl.
*B25B 11/00* (2006.01)

(52) U.S. Cl.
CPC ................................ *B25B 11/005* (2013.01)

(58) Field of Classification Search
CPC ........................... B25B 11/005; B25B 11/007
See application file for complete search history.

(56) References Cited

U.S. PATENT DOCUMENTS

2019/0248025 A1 8/2019 Wagner et al.
2020/0103463 A1* 4/2020 Yanagisawa ......... B25J 15/0625
2021/0053192 A1 2/2021 Wang et al.

FOREIGN PATENT DOCUMENTS

CN 103072822 A * 5/2013 ............ B65G 47/91
JP 2007-331056 A 12/2007
JP 2022-17935 A 1/2022

OTHER PUBLICATIONS

English Translation of Wang (Year: 2012).*
Extended European Search Report issued Apr. 2, 2024 in European Patent Application No. 23214510.2, 10 pages.

* cited by examiner

*Primary Examiner* — Jason L Vaughan
(74) *Attorney, Agent, or Firm* — Oblon, McClelland, Maier & Neustadt, L.L.P.

(57) ABSTRACT

A suction pad includes a body and a sponge member. The body includes a negative pressure chamber, and a plurality of communication passages communicating with the negative pressure chamber. The sponge member includes a plurality of cavities opening toward a workpiece. The cavities communicate with the negative pressure chamber through the communication passages, and flow passage adjustment valves for adjusting a flow passage area are arranged in the communication passages, respectively. The suction pad further includes a pressure detection port for detecting pressure in at least one cavity among the plurality of cavities.

2 Claims, 6 Drawing Sheets

SUCTION PAD

CROSS-REFERENCE TO RELATED APPLICATIONS

This application is based upon and claims the benefit of priority from Japanese Patent Application No. 2022-197654 filed on Dec. 12, 2022, the contents of which are incorporated herein by reference.

BACKGROUND OF THE INVENTION

Field of the Invention

The present invention relates to a suction pad for sucking a workpiece using vacuum pressure, and more particularly to a suction pad capable of confirming the suction state of the workpiece.

Description of the Related Art

Conventionally, there is known a suction pad that sucks a workpiece by bringing a sponge member made of a porous material into contact with the workpiece and generating vacuum pressure inside the sponge member. There is also known a technique for detecting the suction state of a workpiece by detecting pressure in a path through which vacuum pressure is introduced into a suction pad.

For example, JP 2022-017935 A discloses a suction pad including an inner sponge pad formed of an open cell sponge having air permeability, and an outer sponge pad formed of a closed cell sponge having no air permeability. A pressure sensor is disposed on a path through which the suction pad is connected to an ejector, and the suction state of the workpiece sucked by the inner sponge pad and the suction state of the workpiece sucked by the outer sponge pad are sequentially detected.

SUMMARY OF THE INVENTION

In a vacuum suction device that includes a plurality of suction portions (suction pads) and is capable of sucking workpieces of various sizes, check valves (flow passage adjustment valves) may be disposed in respective paths that branch from a vacuum generator and reach the suction portions. By the action of the check valves, the vacuum pressure required for sucking the workpiece acts on the workpiece effectively. Also in a case where a large sponge pad including a large number of suction holes is used to suck workpieces of various sizes, it is desirable to dispose check valves as well.

However, in the vacuum suction device in which the check valves are disposed, the suction state of the workpiece cannot be easily confirmed by simply disposing the pressure sensor. This is because, since the vacuum pressure is maintained by the action of the check valves regardless of whether the workpiece is being sucked or is not being sucked, there is no difference between the pressures detected by the pressure sensor, and the state where the workpiece is being sucked and the state where the workpiece is not being sucked cannot be distinguished from each other.

The present invention has the object of solving the aforementioned problem.

The present invention provides a suction pad comprising: a body; and a sponge member, wherein the body includes a negative pressure chamber, and a plurality of communication passages configured to communicate with the negative pressure chamber, and the sponge member includes a plurality of cavities configured to open toward a workpiece and communicate with the negative pressure chamber through the communication passages. A flow passage adjustment valve configured to adjust a flow passage area is disposed in each of the communication passages, and when vacuum pressure is generated in the negative pressure chamber and a cavity among the plurality of cavities is not closed by the workpiece, a flow passage area of a communication passage among the communication passages that corresponds to the cavity that is not closed by the workpiece is adjusted to be decreased. The suction pad further comprises a pressure detection port configured to detect pressure in at least one cavity among the plurality of cavities.

The suction pad according to the present invention has a structure in which the flow passage adjustment valves are disposed in the communication passages connecting the cavities of the sponge member to the negative pressure chamber, and includes the pressure detection port for detecting the pressure in at least one cavity of the sponge member. Therefore, it is possible to easily confirm whether or not the workpiece is being sucked.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Figure 1:
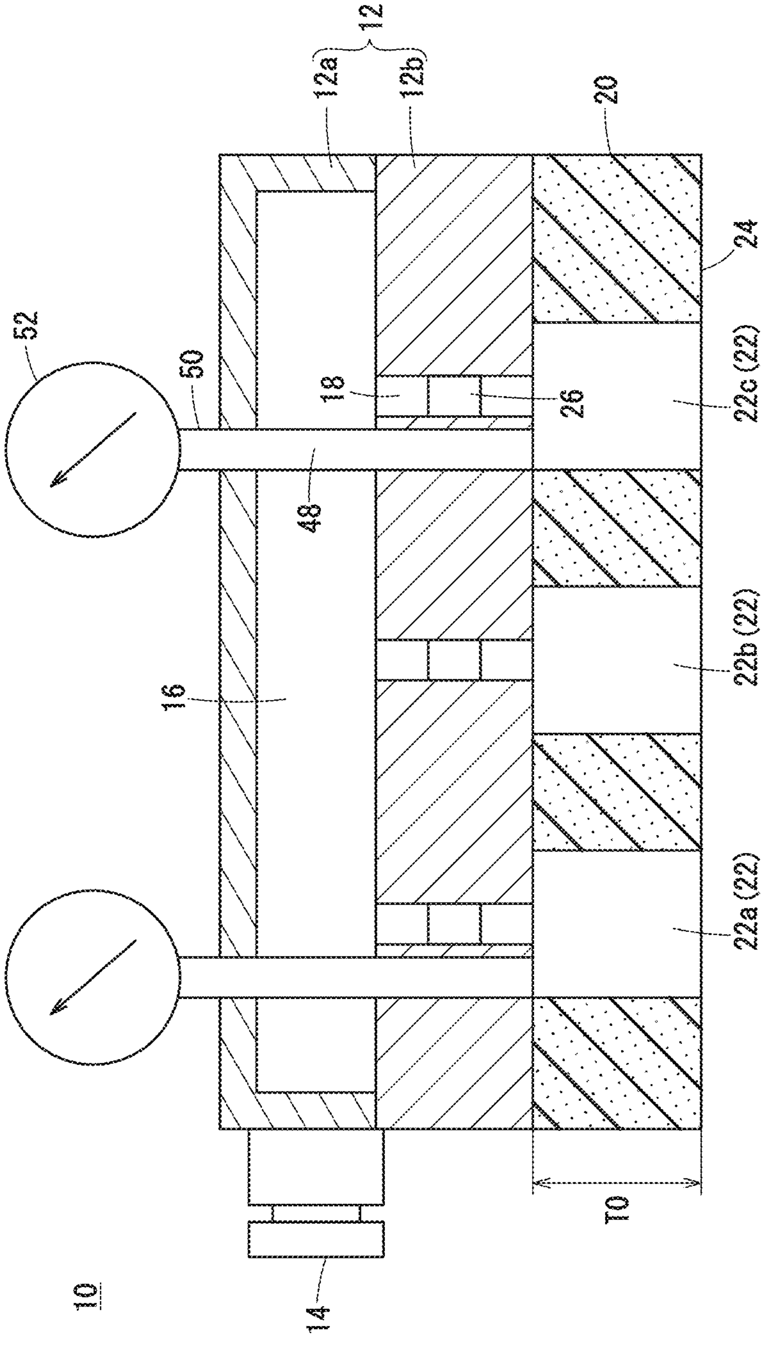
FIG. 1 is a view schematically showing a cross section of a suction pad according to a first embodiment of the present invention.

A suction pad 10 according to a first embodiment of the present invention will be described with reference to FIGS. 1 to 5. As shown in FIG. 1, the suction pad 10 includes a body 12 and a sponge member 20. In the following description, when terms in relation to upper and lower directions are used, such terms refer to the directions shown in the drawings, however, the actual arrangement of the respective constituent members is not limited thereby.

The body 12 is formed of a main body **12*a* that has a box shape and opens downward, and a plate 12*b* that is thick and covers the main body 12*a* from below. The main body 12*a* includes a suction port 14 connected to a vacuum generator (not shown). The body 12 includes therein a negative pressure chamber 16 communicating with the suction port 14. The plate 12***b* includes a plurality of communication passages 18 communicating with the negative pressure chamber 16.

The sponge member 20 having a plate shape is attached to a lower surface of the plate 12*b* by means of bonding or the like. The sponge member 20 includes a plurality of cavities 22 opening toward a workpiece W. The cavities 22 of the sponge member 20 communicate with the negative pressure chamber 16 through the communication passages 18 of the plate 12*b*. The sponge member 20 comes into contact with the workpiece W at a lower surface (bottom surface) 24 thereof.

The sponge member 20 is made of a material having a semi-open and semi-closed cell structure, and is manufactured by foam-molding ethylene propylene rubber (EPDM), for example. The sponge member 20 exhibits flexibility which is a property of open cells until it is compressed by a predetermined amount from a natural state, and exhibits airtightness which is a property of closed cells after it is compressed by the predetermined amount.

The sponge member 20 can be deformed in accordance with the surface shape of the workpiece W by exhibiting flexibility. Even if the workpiece W has irregularities on its surface as in the case of a cardboard box in which beverage containers are packaged, no gap is generated between the sponge member 20 and the workpiece W. The sponge member 20 comes into close contact with the workpiece W and then exhibits airtightness to cause vacuum pressure required for sucking the workpiece W to act on the workpiece W.

The thickness of the sponge member 20 when no vertical compressive force is applied to the sponge member 20 is represented by T0, and the thickness of the sponge member 20 when a vertical compressive force is applied to the sponge member 20 is represented by T. Then, a compression amount (%) of the sponge member 20 is defined as $(T0-T)/T0\times100$. Although depending on the ratio of open cells and closed cells, the sponge member 20 exhibits sufficient airtightness when compressed to a compression amount of at least about 70%, for example.

A flow passage adjustment valve 26 is arranged in the middle of each communication passage 18 of the body 12. The flow passage adjustment valve 26 adjusts the flow passage area of the communication passage 18 in accordance with the suction state of the workpiece W. When the cavity 22 is closed by the workpiece W, the flow passage area of the communication passage 18 is sufficiently increased, and the pressure in the cavity 22 becomes equal to the pressure in the negative pressure chamber 16. That is, when the cavity 22 is closed by the workpiece W, the same vacuum pressure as the vacuum pressure generated in the negative pressure chamber 16 is generated in the cavity 22. When the cavity 22 is not closed by the workpiece W, the flow passage area of the communication passage 18 is sufficiently decreased, and high vacuum pressure is generated in the negative pressure chamber 16, while the pressure in the cavity 22 becomes substantially equal to the atmospheric pressure.

Figure 2:
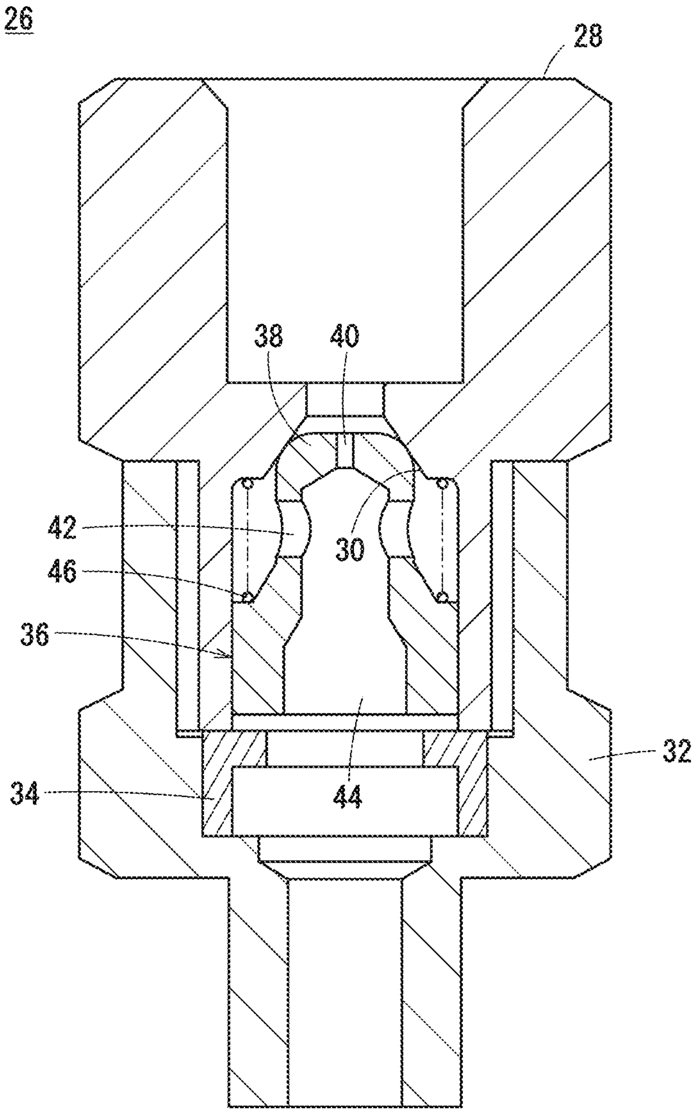
FIG. 2 is a view showing a specific structural example of a flow passage adjustment valve of the suction pad of FIG. 1.

A specific structural example of the flow passage adjustment valve 26 is shown in FIG. 2. The flow passage adjustment valve 26 includes a first joint member 28, a second joint member 32, and a valve element 36. The tubular valve element 36 is disposed inside the tubular first joint member 28, and can be vertically displaced with respect to the first joint member 28. The first joint member 28 is provided with a tapered seat portion 30 against which a head part 38 of the valve element 36 can abut. The tubular second joint member 32 is connected and fixed to the first joint member 28. A stopper 34 capable of abutting against a lower end of the valve element 36 is attached to the second joint member 32. By the valve element 36 abutting against the stopper 34, downward displacement of the valve element 36 is regulated.

The head part 38 of the valve element 36 includes an orifice 40 at its center, and the orifice 40 communicates with an inner space 44 of the valve element 36. A sidewall of the valve element 36 includes a plurality of openings 42 that communicate with the inner space 44 of the valve element 36. The area of the opening 42 is sufficiently larger than the area of the orifice 40. The inner space 44 of the valve element 36 communicates, at the lower end thereof, with an internal space of the second joint member 32. A spring 46 for biasing the valve element 36 downward is disposed between the first joint member 28 and the valve element 36.

In a state where the head part 38 of the valve element 36 is separated from the seat portion 30 of the first joint member 28, an internal space of the first joint member 28 that is located above the seat portion 30 communicates with the inner space 44 of the valve element 36 via the orifice 40 and the plurality of openings 42 of the valve element 36. In a state where the head part 38 of the valve element 36 is in abutment against the seat portion 30 of the first joint member 28, the internal space of the first joint member 28 that is located above the seat portion 30 communicates with the inner space 44 of the valve element 36 only via the orifice 40 of the valve element 36.

When vacuum pressure is generated in the negative pressure chamber 16 in a state where the cavity 22 is not closed by the workpiece W, air passes through the orifice 40 of the valve element 36 from the lower side toward the upper side at a high flow velocity. Therefore, the valve element 36 is displaced upward by the pressure difference generated before and after the orifice 40, and the head part 38 of the valve element 36 abuts against the seat portion 30 of the first joint member 28. When the head part 38 of the valve element 36 abuts against the seat portion 30, the flow passage area of the communication passage 18 decreases, and the flow velocity of the air passing through the orifice 40 further increases. As a result, the state where the head part 38 of the valve element 36 is in abutment against the seat portion 30 of the first joint member 28 is reliably maintained.

When the cavity 22 is closed by the workpiece W, the flow rate of the air passing through the orifice 40 of the valve element 36 decreases, and the flow velocity of the air passing through the orifice 40 decreases. Therefore, the pressure difference generated before and after the orifice 40 becomes small, the valve element 36 is displaced downward by the biasing force of the spring 46, and the head part 38 of the valve element 36 moves away from the seat portion 30 of the first joint member 28. When the head part 38 of the valve element 36 moves away from the seat portion 30, the flow passage area of the communication passage 18 increases.

The suction pad 10 can suck workpieces W of various sizes. The pressure in the negative pressure chamber 16 of the body 12 does not increase even if the workpiece W is small enough to contact only a part of the bottom surface 24 of the sponge member 20 and one or some of the cavities 22 of the sponge member 20 are open to the atmosphere. That is, even if there is a cavity 22 which is not closed by the workpiece W, the vacuum pressure generated in the negative pressure chamber 16 does not decrease due to the action of the flow passage adjustment valve 26.

The body 12 includes a detection passage 48 for detecting the pressure in a predetermined cavity 22 of the sponge member 20. The detection passage 48 is arranged for each of one or more selected cavities 22. The detection passage 48 vertically passes through the negative pressure chamber 16 and extends from an upper surface to a lower surface of the body 12, and a lower end of the detection passage 48 communicates with the corresponding cavity 22. An upper end of each detection passage 48 forms a pressure detection port 50. A pressure sensor 52 is individually connected to each pressure detection port 50. The pressure in the selected cavity 22 is detected by the pressure sensor 52.

Among the plurality of cavities 22, the cavity 22 for which the detection passage 48 is correspondingly arranged is determined in consideration of the size of the workpiece W to be sucked. When the workpiece W of a predetermined size comes into contact with the sponge member 20, the detection passages 48 are arranged corresponding to one or more cavities 22 closed by the workpiece W, and one or more cavities 22 that are not closed by the workpiece W. In order to explain the principle of the present invention using a simple drawing, FIG. 1 shows three cavities 22*a* to 22*c*. The detection passages 48 and the pressure sensors 52 are arranged corresponding to the cavity 22*a* and the cavity 22*c* among the three cavities.

Next, the operation of the suction pad 10 according to the present embodiment for sucking the workpiece W will be described. The suction pad 10 is used by being attached to, for example, a conveying device (not shown).

When a command for sucking the workpiece W placed on a floor surface or the like and conveying the workpiece W to a predetermined place is issued from a host controller (not shown) such as a PLC, the conveying device is driven and the suction pad 10 comes into contact with the workpiece W. At the same time or prior thereto, air in the negative pressure chamber 16 is sucked from the suction port 14 toward the vacuum generator. Although all the cavities 22 of the sponge member 20 are open to the atmosphere, the flow passage areas of the communication passages 18 are reduced by the flow passage adjustment valves 26. Therefore, high vacuum pressure is easily generated in the negative pressure chamber 16.

Figure 3:
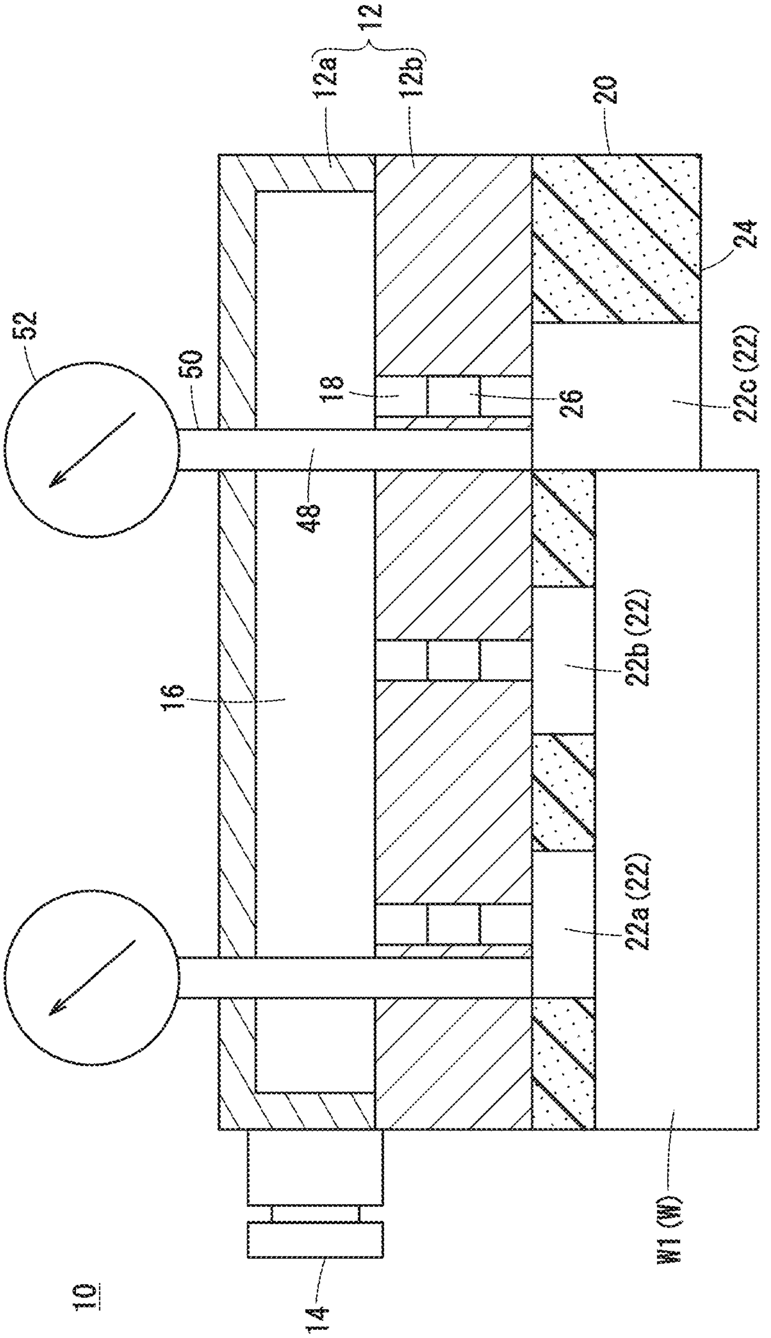
FIG. 3 is a view schematically showing a cross section of the suction pad of FIG. 1 when sucking a workpiece having a small size.

When a workpiece W1 having a small size comes into contact with a part of the bottom surface 24 of the sponge member 20, one or some of the cavities 22 of the sponge member 20 are closed by the workpiece W1. Referring to FIG. 3, the cavity 22*a* and the cavity 22*b* are closed by the workpiece W1, and the cavity 22*c* is not closed by the workpiece W1. The cavities 22*a* and 22*b* closed by the workpiece W1 communicate with the negative pressure chamber 16 through the communication passages 18 whose flow passage areas are sufficiently increased by the flow passage adjustment valves 26. Therefore, the vacuum pressure generated in the negative pressure chamber 16 is directly transmitted to the cavities 22*a* and 22*b* and acts on an upper surface portion of the workpiece W1 that is in contact with the cavities 22*a* and 22*b*. Since the cavity 22*c*, which is not closed by the workpiece W1, communicates with the negative pressure chamber 16 through the communication passage 18 whose flow passage area is reduced, the vacuum pressure generated in the negative pressure chamber 16 does not decrease.

Due to the vacuum pressure generated in the negative pressure chamber 16, an upward force (lifting force) acts on the workpiece W1. The lifting force is represented by $\Delta P \cdot S$, where $\Delta P$ represents a difference between the atmospheric pressure and the pressure in the negative pressure chamber 16, and S is the total cross-sectional area of the cavities 22 closed by the workpiece W1. On the other hand, a downward force acting on the workpiece W1 is represented by (W+F), where W represents a weight of the workpiece W1 and F is a repulsive force caused by the compression of the sponge member 20. The repulsive force F changes according to the compression amount of the sponge member 20. When the sponge member 20 is compressed by a predetermined amount, $\Delta P \cdot S = W + F$ is established. That is, the upward force and the downward force acting on the workpiece W1 are balanced, and the workpiece W1 is stably held by the suction pad 10.

Figure 4:
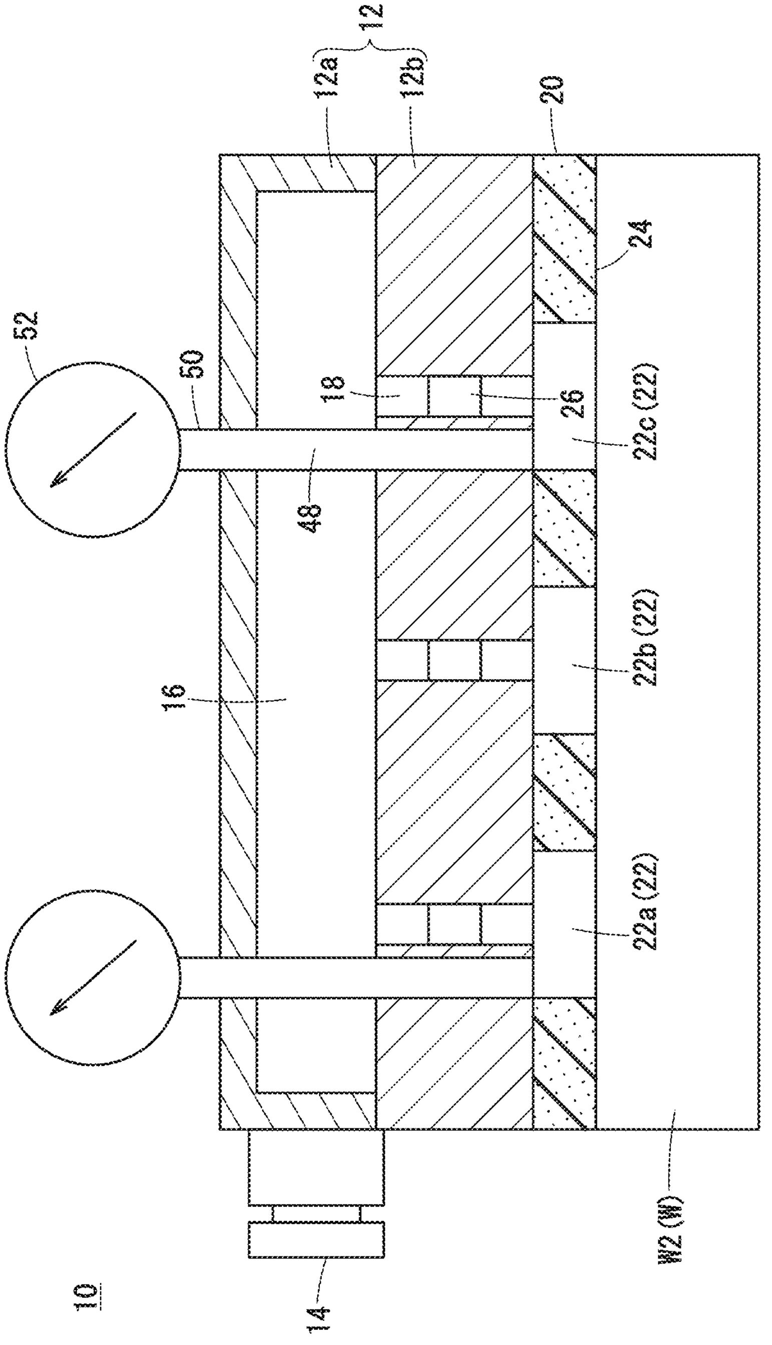
FIG. 4 is a view schematically showing a cross section of the suction pad of FIG. 1 when sucking a workpiece having a large size.

When a workpiece W2 having a large size comes into contact with the entire bottom surface 24 of the sponge member 20, all the cavities 22 of the sponge member 20 are closed by the workpiece W2. Referring to FIG. 4, the cavities 22*a* to 22*c* communicate with the negative pressure chamber 16 through the communication passages 18 whose flow passage areas are sufficiently increased by the flow passage adjustment valves 26, and the vacuum pressure acts on an upper surface portion of the workpiece W2 that is in contact with the cavities 22*a* to 22*c*. As in the case of the workpiece W1 having a small size, the upward force and the downward force acting on the workpiece W2 are balanced, whereby the workpiece W2 is stably held by the suction pad 10.

Next, a method of confirming the suction state of the workpiece W using the suction pad 10 according to the present embodiment will be described.

When the workpiece W1 having such a size that it contacts only a part of the bottom surface 24 of the sponge member 20 is being sucked, the vacuum pressure is detected by at least one of the pressure sensors 52 and the atmospheric pressure is detected by the remaining pressure sensors 52. Referring to FIG. 3, the pressure sensor 52 corresponding to the cavity 22*a* closed by the workpiece W1 indicates the vacuum pressure, and the pressure sensor 52 corresponding to the cavity 22*c* that is not closed by the workpiece W1 indicates the atmospheric pressure. On the other hand, when the workpiece W1 is not being sucked, the atmospheric pressure is detected by these pressure sensors 52. Therefore, by monitoring the pressures detected by the respective pressure sensors 52, it is possible to determine whether or not the workpiece W1 is being sucked.

When the workpiece W2 having such a size that it contacts the entire bottom surface 24 of the sponge member 20 is being sucked, the vacuum pressure is detected by all the pressure sensors 52. Referring to FIG. 4, both the pressure sensors 52 corresponding to the cavity 22*a* and the cavity 22*c* closed by the workpiece W2 indicate the vacuum pressure. On the other hand, when the workpiece W2 is not being sucked, the atmospheric pressure is detected by these pressure sensors 52. Therefore, by monitoring the pressures detected by the respective pressure sensors 52, it is possible to determine whether or not the workpiece W2 is being sucked.

Figure 5:
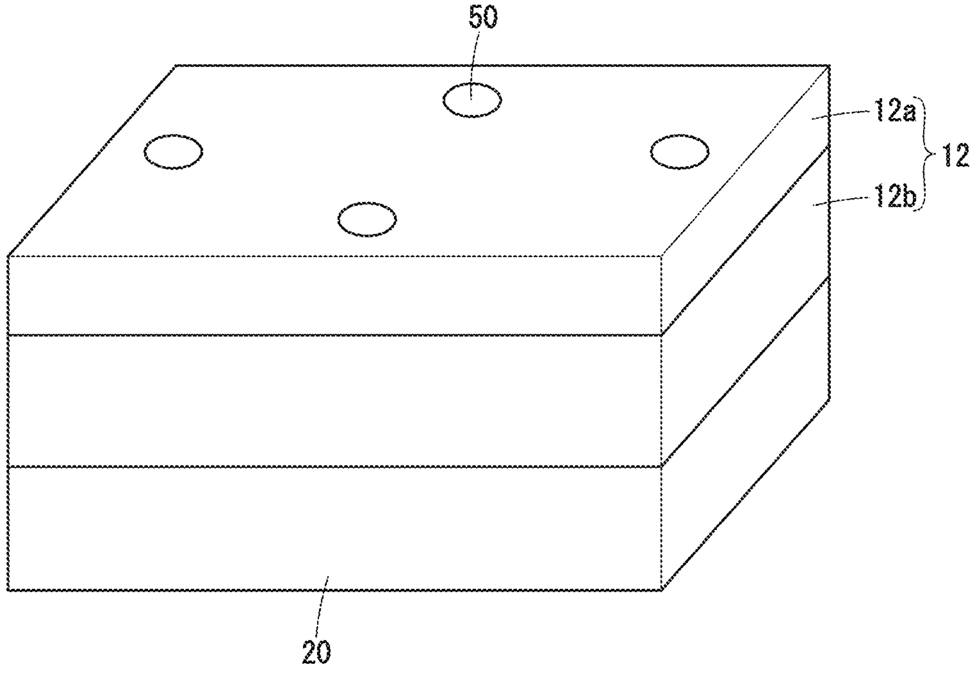
FIG. 5 is a view showing an arrangement example of pressure detection ports in the suction pad of FIG. 1.

If the plurality of pressure detection ports 50 are arranged efficiently, the suction state of the workpiece W can be accurately confirmed. FIG. 5 shows an example in which four pressure detection ports 50 are arranged near the centers of four sides of the upper surface of the body 12. In particular, even if there is a variation in the position at which the workpiece W1 having a small size comes into contact with the bottom surface 24 of the sponge member 20, there is a high probability that at least one of the four cavities 22 corresponding to these four pressure detection ports 50 is closed by the workpiece W1. That is, even if the accuracy of the suction position of the workpiece W with respect to the sponge member 20 is low, it is possible to easily confirm whether or not the workpiece W is being sucked.

The suction pad 10 according to the present embodiment includes flow passage adjustment valves 26 that adjust the flow passage areas of the communication passages 18 in accordance with the suction state of the workpiece W. Therefore, the vacuum pressure generated in the negative pressure chamber 16 can be caused to act, without being decreased, on an upper surface of the workpiece W that is in contact with the cavity (cavities) 22. In addition, since the pressure detection ports 50 for detecting the pressure in one or more cavities 22 of the sponge member 20 are provided, it is possible to easily confirm whether or not the workpiece W is being sucked.

In the present embodiment, the detection passages 48 each vertically pass through the negative pressure chamber 16 and extend from the upper surface to the lower surface of the body 12, but the configuration of each detection passage is not limited thereto as long as the detection passage communicates with the cavity 22. For example, the detection passage may be branched from the communication passage 18 at a position lower than the flow passage adjustment valve 26 and opened to a side surface of the body 12 without passing through the negative pressure chamber 16.

Further, in the present embodiment, the flow passage adjustment valves 26 are disposed in all of the communication passages 18, but the flow passage adjustment valve 26 may not be disposed in some of the communication passages 18. For example, the flow passage adjustment valve 26 may not be disposed in the communication passage 18 corresponding to the cavity 22 having a high probability of being closed by the workpiece W regardless of the size of the workpiece W. In this case, the detection passage 48 including the pressure detection port 50 may be disposed corresponding to only one cavity 22 for which the flow passage adjustment valve 26 is not disposed.

Second Embodiment

Figure 6:
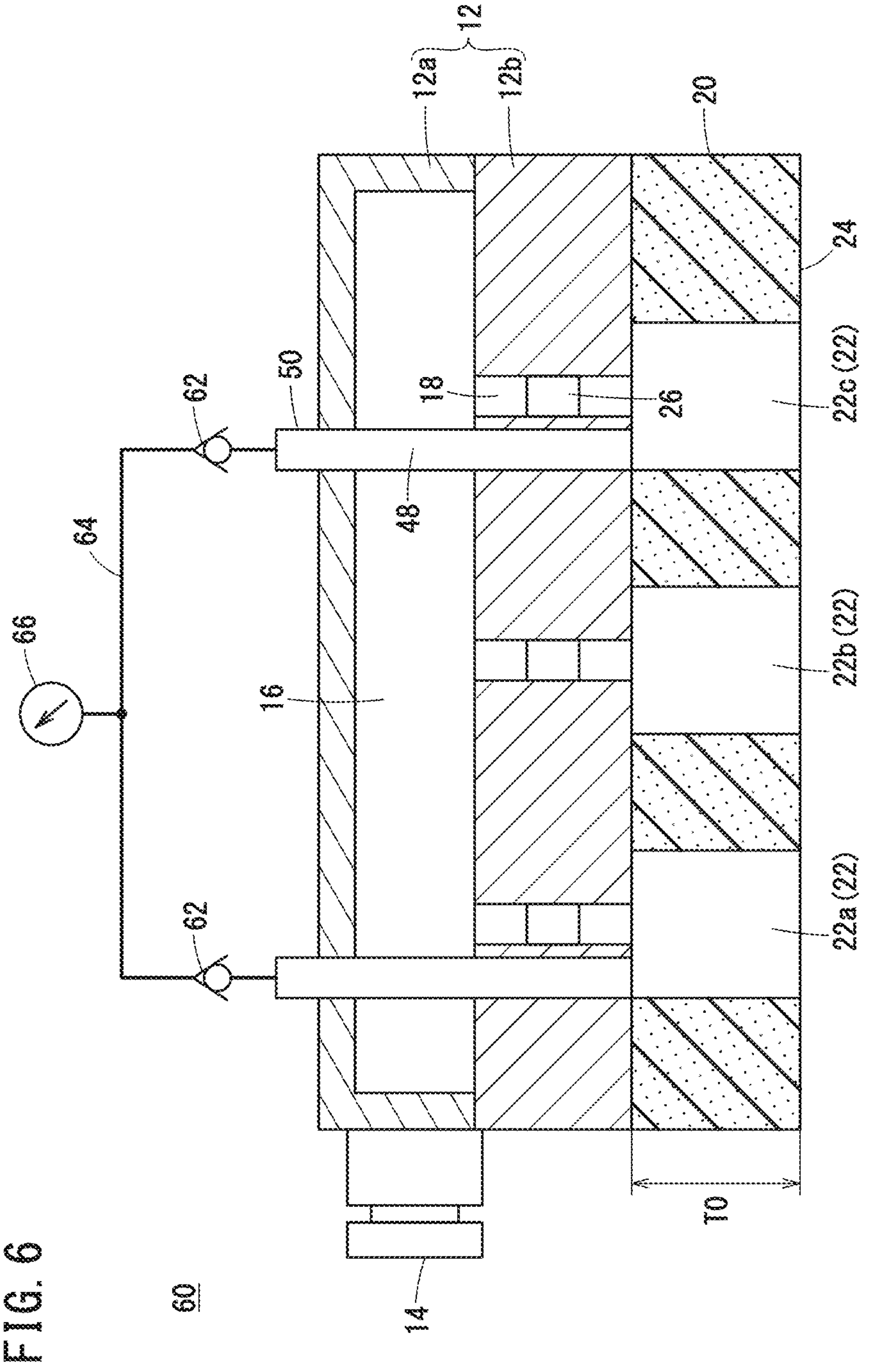
FIG. 6 is a view schematically showing a cross section of a suction pad according to a second embodiment of the present invention.

A suction pad 60 according to a second embodiment of the present invention will be described with reference to FIG. 6. Constituent elements that are the same as or equivalent to those of the suction pad 10 according to the first embodiment are denoted by the same reference numerals, and detailed description thereof is omitted.

The detection passage 48 of the body 12 is arranged for each of a plurality of selected cavities 22. The upper end of each detection passage 48 forms the pressure detection port 50. The respective pressure detection ports 50 are connected to a common flow path 64 via check valves 62, and a single pressure sensor 66 is connected to the common flow path 64. That is, the common pressure sensor 66 is connected to the plurality of pressure detection ports 50 via the check valves 62.

When at least one cavity 22 among the plurality of selected cavities 22 is closed by the workpiece W, vacuum pressure is generated in this cavity 22, and the vacuum pressure is detected by the pressure sensor 66. On the other hand, when the plurality of selected cavities 22 are not closed by the workpiece W, the pressure detected by the pressure sensor 66 remains the atmospheric pressure. Therefore, by monitoring the pressure detected by the pressure sensor 66, it is possible to determine whether or not the workpiece W is being sucked.

The present invention is not limited to the above disclosure, and various modifications are possible without departing from the essence and gist of the present invention.

The invention claimed is:

1. A suction pad comprising: a body; and a sponge member, wherein the body includes a negative pressure chamber, and a plurality of communication passages configured to communicate with the negative pressure chamber, and the sponge member includes a plurality of cavities configured to open toward a workpiece and communicate with the negative pressure chamber through the communication passages, a flow passage adjustment valve configured to adjust a flow passage area is disposed in each of the communication passages, and when vacuum pressure is generated in the negative pressure chamber and a cavity among the plurality of cavities is not closed by the workpiece, a flow passage area of a communication passage among the communication passages that corresponds to the cavity that is not closed by the workpiece is adjusted to be decreased, the suction pad further comprises a pressure detection port configured to detect pressure in at least one cavity among the plurality of cavities, wherein:

the body includes a detection passage configured to communicate with a corresponding one of the cavities of the sponge member, the detection passage vertically passes through the body, and an end of the detection passage forms the pressure detection port.

2. The suction pad according to claim 1, wherein the pressure detection port is disposed near a center of each of four sides of an upper surface of the body.

* * * * *